US010026060B2

(12) United States Patent
Flores et al.

(10) Patent No.: US 10,026,060 B2
(45) Date of Patent: Jul. 17, 2018

(54) ENABLING DYNAMIC POLYMORPHIC ASSET CREATION AND REUSE

(71) Applicants: Romelia H. Flores, Keller, TX (US); Leonard S. Hand, Rochester, NY (US); Jeffery R. Washburn, Justin, TX (US)

(72) Inventors: Romelia H. Flores, Keller, TX (US); Leonard S. Hand, Rochester, NY (US); Jeffery R. Washburn, Justin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 13/773,932

(22) Filed: Feb. 22, 2013

(65) Prior Publication Data

US 2014/0244574 A1 Aug. 28, 2014

(51) Int. Cl.
*G06Q 10/10* (2012.01)
(52) U.S. Cl.
CPC .................. *G06Q 10/103* (2013.01)
(58) Field of Classification Search
CPC .................. G06F 17/30011; G06Q 10/10
USPC ........................................................ 707/608
See application file for complete search history.

(56) References Cited

U.S. PATENT DOCUMENTS

| | | | | |
|---|---|---|---|---|
| 5,424,944 A * | 6/1995 | Kelly et al. | ................... | 705/28 |
| 6,006,242 A * | 12/1999 | Poole et al. | ................. | 715/209 |
| 7,908,244 B2 * | 3/2011 | Royo et al. | ................... | 707/604 |
| 8,290,958 B2 * | 10/2012 | Boone et al. | ................. | 707/738 |
| 2006/0036612 A1 * | 2/2006 | Harrop et al. | ................ | 707/100 |
| 2007/0022128 A1 * | 1/2007 | Rothschiller et al. | ........ | 707/100 |
| 2007/0055926 A1 | 3/2007 | Christiansen et al. | | |
| 2009/0031239 A1 * | 1/2009 | Coleran et al. | ............... | 715/771 |
| 2009/0070370 A1 * | 3/2009 | Cunningham et al. | .... | 707/104.1 |
| 2009/0089189 A1 * | 4/2009 | Berry et al. | .................... | 705/30 |
| 2009/0327277 A1 * | 12/2009 | Sanborn et al. | .................. | 707/5 |
| 2010/0333067 A1 * | 12/2010 | Goh et al. | ...................... | 717/121 |
| 2011/0029861 A1 * | 2/2011 | Herbeck et al. | .............. | 715/255 |
| 2011/0047217 A1 | 2/2011 | Arnaud et al. | | |
| 2011/0167070 A1 * | 7/2011 | Ananthanarayanan et al. | ............................. | 707/741 |
| 2011/0185346 A1 * | 7/2011 | Andrade et al. | .............. | 717/151 |

* cited by examiner

*Primary Examiner* — Rehana Perveen
*Assistant Examiner* — Hicham Skhoun
(74) *Attorney, Agent, or Firm* — Steven M. Greenberg, Esq.; CRGO Law

(57) ABSTRACT

An asset within a repository can be identified. The asset can be an electronic file. The asset can include an asset content and an asset metadata. The asset content can include a static content and a dynamic content. The asset can be semantically disassembled into one or more assemblies. The assemblies can each include an asset data and an assembly data. The assembly data can include an assembly identifier, an assembly rule, or an asset data source. A data container format associated with the asset content can be determined. The data container can be a computing data structure. The asset content can be dynamically presented within a different data container format in accordance with the request.

20 Claims, 4 Drawing Sheets

ENABLING DYNAMIC POLYMORPHIC ASSET CREATION AND REUSE

BACKGROUND

The present invention relates to the field of digital asset management and, more particularly, to enabling dynamic polymorphic asset creation and reuse.

Traditionally, assets (e.g., documentation, source code) within a computing environment such as an enterprise environment typically proceed through a typical life cycle of creation, utilization, and eventually destruction. Assets are usually created from work performed within the enterprise and are commonly persisted within enterprise repositories. Current enterprise policies favor asset reuse which enables the asset to provide value to many users. Unfortunately, this value is often inhibited by assets which can include an extremely large amount of data, irrelevant data and/or assets which include outdated data. Consequently, to reuse assets, many users must perform additional work to utilize the asset. This current approach to asset reuse is cumbersome and time consuming for users.

Further, traditional asset inventory management systems permit users to search the inventory for a desired asset and leverage the asset in a user specific way. Several flaws of this traditional system hinder asset reuse and user productivity. For example, a consumer can be unfamiliar with an asset and must "prune" assets before the asset can be usable. Additionally, validation of asset content is limited which can result in low asset reusability in many instances. Due to current coarse grained feedback implementations in management systems, many assets remain unchanged and retain low value. As such, asset reuse remains difficult to maximize and encompass additional work which inhibits potential gains.

BRIEF SUMMARY

One aspect of the present invention can include a system, an apparatus, a computer program product, and a method for enabling dynamic polymorphic asset creation and reuse such that an asset within a repository can be identified. The asset can be an electronic file that includes static content, dynamic content, and asset metadata. The asset can be semantically disassembled into one or more assemblies. The assemblies can each include an asset data and an assembly data. The assembly data can include an assembly identifier, an assembly rule, or an asset data source. A data container format associated with the asset content can be determined. The data container can be a computing data structure. In response to a request, the asset content can be dynamically presented in various formats in accordance with the request.

Another aspect of the present invention can include an apparatus, a computer program product, a method, and a system for enabling dynamic polymorphic asset creation and reuse. A polymorphic engine can be configured to dynamically create a polymorphic asset using a polymorphic engine. The polymorphic asset can be an asset of one or more assemblies. The assemblies can be associated with a portion of a source asset. The source asset can be a digital content. A data store can be able to persist an assembly index, an assembly data, an asset, or an engine setting.

Yet another aspect of the present invention can include a computer program product that includes a computer readable storage medium having embedded computer usable program code. The computer usable program code can be configured to identify an asset within a repository. The asset can be an electronic file. The asset can include an asset content and an asset metadata. The asset content can include a static content and a dynamic content. The computer usable program code can be configured to disassemble the asset into one or more assemblies. The assemblies can each include an asset data and an assembly data. The assembly data can include an assembly identifier, an assembly rule, or an asset data source. The computer usable program code can be configured to determine a data container format associated with the asset content. The data container can be a computing data structure. In response to a request, the computer usable program code can be configured to dynamically present the asset content within a different data container format in accordance with the request.

DETAILED DESCRIPTION

Figure 1A:
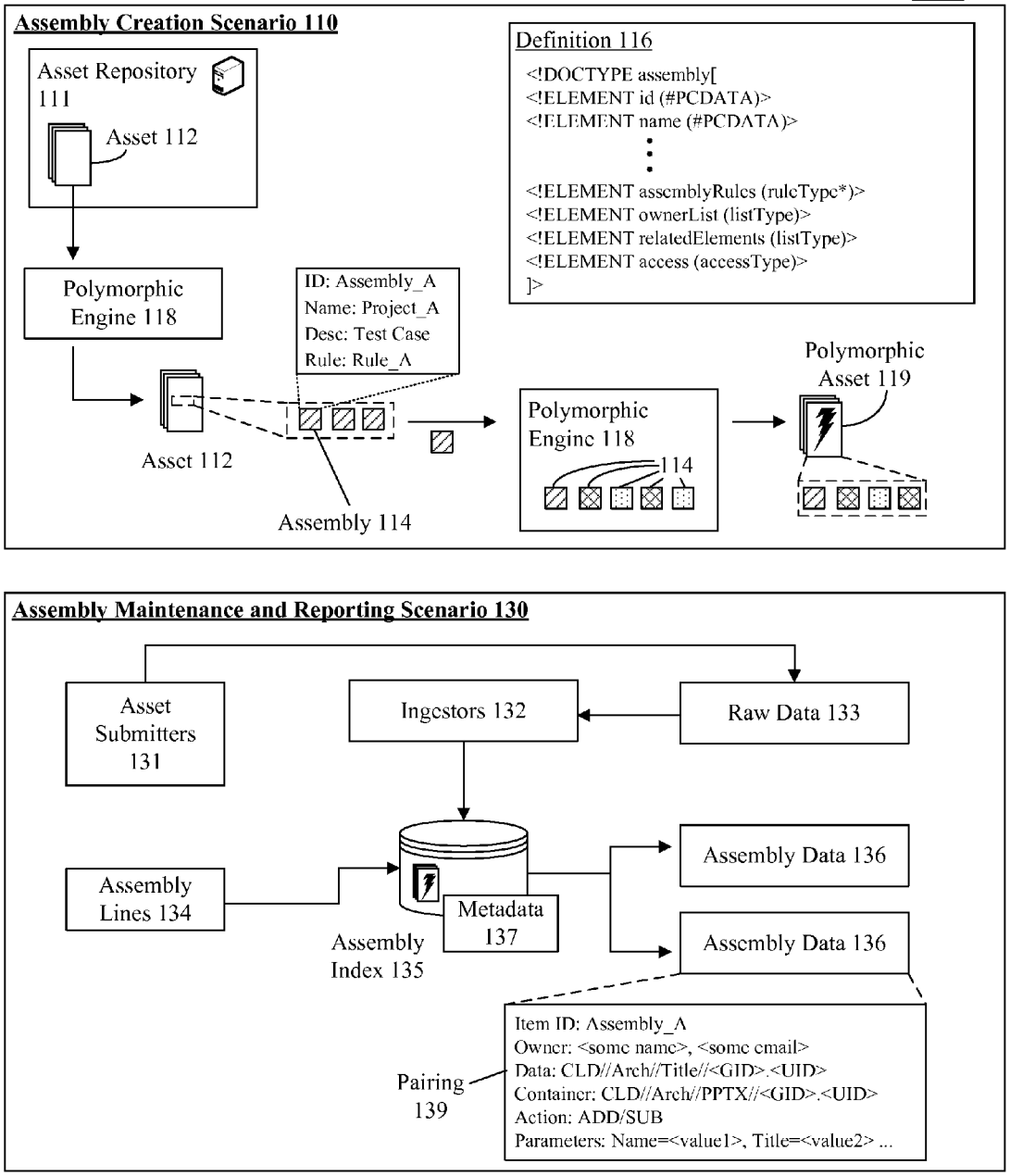
FIG. 1A is a schematic diagram illustrating a set of scenarios for enabling dynamic polymorphic asset creation and reuse in accordance with an embodiment of the inventive arrangements disclosed herein.

The present disclosure is a solution for enabling dynamic polymorphic asset creation and reuse. In the solution, an asset can be decomposed into an assembly which can be utilized to dynamically provide customized assets. Assemblies can include, but is not limited to, asset data, assembly metadata, tagging data, and the like. The assemblies can be persisted within a warehouse which can permit assembly lines to dynamically generate consumer queried assets. Consumption of the assets can trigger feedback from consumer to asset provider (e.g., creator, submitter, etc). The feedback can include granular feedback (e.g., asset data usability, assembly reuse) which can enable subsequent asset creation improvement (e.g., updated asset data).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a set of scenarios 110, 130 for enabling dynamic polymorphic asset creation and reuse in accordance with an embodiment of the inventive arrangements disclosed herein. Scenarios 110, 130 can be present in the context of scenario 150, method 100C, method 200, and/or system 300. In scenario 110, a polymorphic engine can enable high asset 112 reuse by permitting reuse of portions of asset 112. Asset 112 can be "broken down" into atomic elements (e.g., assembly 114) which can be organized and indexed to permit singular and/or aggregate usage of asset assembly 114. That is, new and valuable assets can be created from parts of one or more existing assets.

As used herein, an asset 112 can be an intellectual property, an electronic file, a presentation, a model, a source code, and the like. Asset 112 can be associated with one or more workflows, users, owners, submitters, access permissions, statuses, metadata, and the like. For example, an asset can be a collection of documents associated with a project (e.g., zip file). Asset 112 can be persisted within an asset repository 111, a computing device, and the like. Asset 112 can be associated with an enterprise asset management infrastructure. Enterprise asset management can include business processes (e.g., workflows) and/or information systems (e.g., repository 111) which support management of an organization's assets.

Asset 112 can be associated with a digital asset management entity such as an asset repository 111 (e.g., warehouse). As used herein, digital asset management can include a form of electronic media content management which can include digital assets. Digital assets can include, but is not limited to, audio content, video content, text content, and the like. Digital asset management (DAM) can include, but is not limited to, management tasks and decisions surrounding the ingestion, annotation, cataloguing, storage, retrieval, distribution of digital assets, and the like. DAM can include procedures/policies for downloading, renaming, backing up, rating, grouping, archiving, optimizing, maintaining, thinning, exporting files, and the like.

Asset 112 can be associated with metadata which can include, but is not limited to, the description of asset content, encoding/decoding format (e.g. JPEG, TAR, MPEG 2), provenance (e.g., history to point of capture), ownership information, rights of access, and the like.

In scenario 110, an asset 112 within an asset repository 111 can be decomposed into an assembly 114. In one instance, assembly 114 can be associated with an index 135 which can conform to a Document Type Definition (DTD)

116. Definition 116 can delineate assembly construction which can include, but is not limited to, metadata information, a status information, an evaluation status, an output type, a data source, a raw data source, an approval list, an assembly rule, an owners list, a related elements reference, an access type, and the like. For example, index 135 can be an Extensible Markup Language (XML) formatted entity which can include an assembly identifier: Assembly_A, a name: Project_A, and a description: Test Case.

In one embodiment, one or more assemblies 114 can be utilized to create a polymorphic asset 119. In the embodiment, asset 119 can be a customized digital content including one or more assemblies 114 from one or more assets 112. For example, asset 119 can be a zip file package of a document from an Asset_A and an image from an Asset_B. It should be appreciated that polymorphic asset 119 can conform to a format associated with a source asset (e.g., Asset_A, Asset_B), a user preference, a system setting, and the like. For example, asset 119 can be a Portable Document Format (PDF) which can encapsulate one or more assemblies 114 of differing formats (e.g., JPEG, XML).

Assembly 114 can be associated with one or more assembly rules which can dictate assembly 114 organization and/or enhancement into assets. For example, assembly 114 can be associated with a Rule_A which can permit only assemblies of a text format to be combined into a polymorphic asset 119. It should be appreciated that assembly rules can be arbitrarily complex. In one instance, rules can conform to a traditional and/or proprietary syntax.

Asset 119 can be created in response to a query such as a knowledge query. In one embodiment, asset 119 can be generated in real-time or near real-time. It should be appreciated that once asset 119 is created the asset 119 can be conveyed to an interface associated with the query. It should be appreciated that the disclosure can update individual assemblies 114 in response to data changes (e.g., automated update), user initiated asset changes, and the like. That is, polymorphic assets 119 can include current data although asset 112 can include outdated data.

Scenario 130 can include, but is not limited to asset submitters 131, ingestors 132, raw data 133, assembly lines 134 assembly index 135, assembly data 136 and/or metadata 137. In scenario 130, asset submitters 131 can provide raw data 133 to ingestors 132. For example, a user can submit an asset 112 to an asset repository submission component. Ingestors 132 can generate assembly 114, assembly index 135, assembly data 136, and/or metadata 137. Assembly index 135 can permit assembly 114 properties to be determined which can enable an appropriate asset to be constructed. In one instance, index 135 can utilize assembly 114 information to locate assembly data 136 which can be utilized in the construction of asset 119.

Assembly data 136 can include data associated with the assembly 114 and can be persisted within a text format, a binary format, and the like. In one instance, assembly data 136 can conform to a name value pairing format, an Extensible Markup Language format, and the like. For example, data 136 can include a pairing 139 which can identify a container format, and parameters associated with the assembly data. It should be appreciated that container format information can be leveraged to enable polymorphic capabilities of the asset. For example, changing the container information of pairing 139 (e.g., from a PPTX to a PDF) can permit engine 118 to encapsulate assembly in an appropriate container (e.g., PDF container).

In one instance, metadata 137 can include user feedback, tagging data, assembly rules, and the like. In the instance, metadata 137 can be utilized to determine boundaries which can permit the disassembling/assembling of asset 112 into one or more assemblies 114. For example, user tags can identify asset content which can permit semantic deconstruction/construction of relevant assemblies.

It should be appreciated that assembly data can include external data. External data can be reference via a link (e.g., Uniform Resource Identifier), a reference (e.g., pointer), and the like. It should be appreciated that external data can include static content, dynamic content, and the like.

Drawings presented herein are for illustrative purposes only and should not be construed to limit the invention in any regard. It should be appreciated that asset consumption can be offered by assembly line owners. An assembly line owner can organize and/or represent a series of assemblies which can enable use by a consumer. The offered assembly line can be configured within the constraints of a factory line. Assembly lines can be a subset of factory lines which can produce one or more results. It should be appreciated that an assembly can be associated with one or more assembly lines. The assembly lines can be present in one or more factory lines.

Figure 1B:
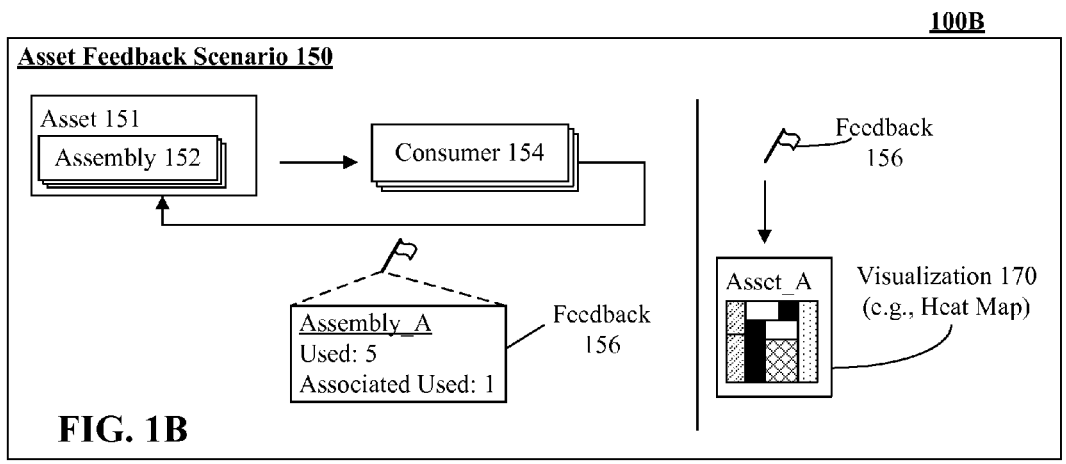
FIG. 1B is a schematic diagram illustrating a set of scenarios for enabling dynamic polymorphic asset creation and reuse in accordance with an embodiment of the inventive arrangements disclosed herein.

FIG. 1B is a schematic diagram illustrating a scenario 150 for enabling dynamic polymorphic asset creation and reuse in accordance with an embodiment of the inventive arrangements disclosed herein. In scenario 150, the disclosure can enable granular feedback 156 from an asset 151. Feedback 156 can be utilized to generate one or more visualizations 170. Scenario 150 can be present in the context of scenario 110, 130, method 100C, method 200, and/or system 300.

In scenario 150, an asset 151 can include one or more assemblies 152 which can be available for consumption. Assembly 152 can be conveyed to consumer 154 which can consume assembly 152. Consumer 154 can create feedback 156 which can be associated with an appropriate assembly 152. Feedback 156 can include user provided data (e.g., comments), automatically collected data (e.g., metrics), and the like. For example, an Assembly_A can be associated with a usage metric such as a utilization quantity and an associated assembly utilization quantity.

In one embodiment, feedback 156 can be utilized to automate a ranking system within an asset warehouse. In the embodiment, feedback 156 can promote and/or demote assembly rating which can affect assembly incorporation into polymorphic asset. That is, assemblies can be dynamically selected based on one or more metrics (e.g., ranking, usage parameters) during asset creation.

Feedback 156 can be utilized to create a visualization 170 which can permit "high" level views of asset utilization and reuse. Visualization 170 can include, but is not limited to, a heat map, a graph, a graphic, an infographic, and the like. Visualization 170 can be associated with an assembly, an asset, and the like. In one instance, visualization 170 can be presented within a graphical user interface. For example, visualization 170 can be presented within an administrative interface of an asset warehouse. In one embodiment, visualization 170 can permit "drilling down" actions which enable granular views of assembly data, assembly metadata, feedback, and the like.

Figure 1C:
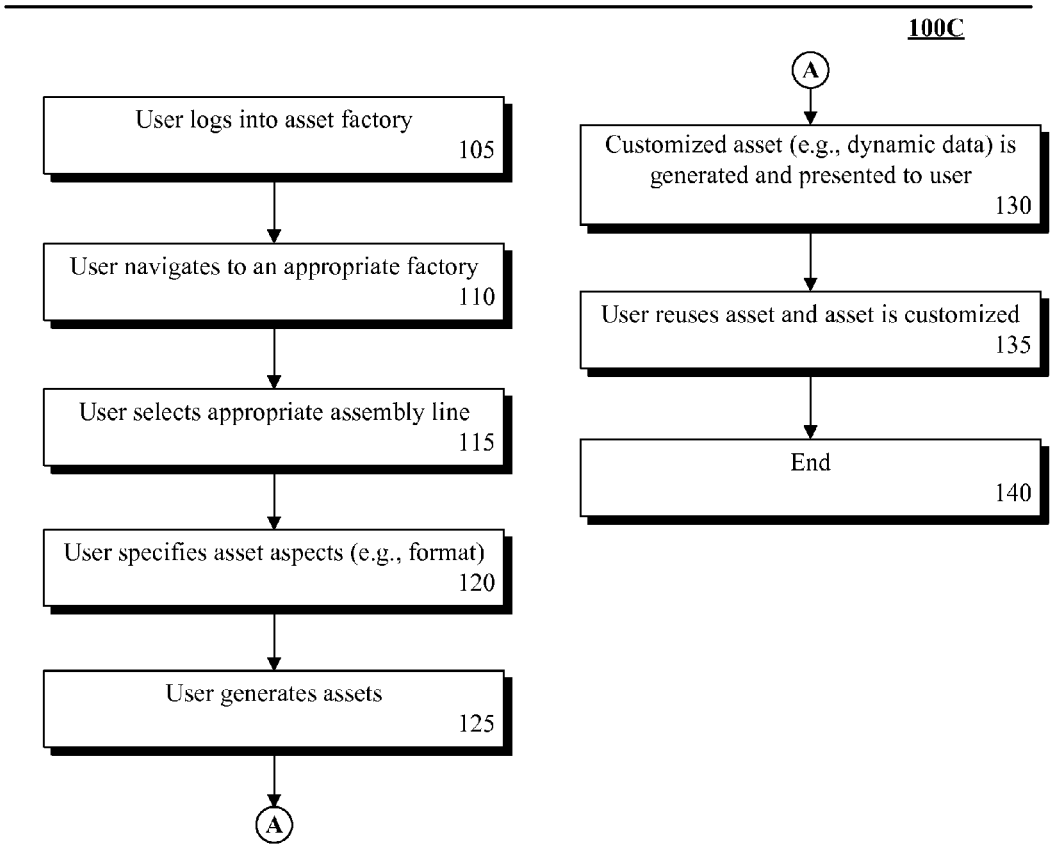
FIG. 1C is a flowchart illustrating a method for enabling dynamic polymorphic asset creation and reuse in accordance with an embodiment of the inventive arrangements disclosed herein.

FIG. 1C is a flowchart illustrating a method 100C for enabling dynamic polymorphic asset creation and reuse in accordance with an embodiment of the inventive arrangements disclosed herein. In method 100C, a knowledge query for an asset can be received. The query can be processed and an appropriate asset can be conveyed to the query submitter. The asset can be an asset, a polymorphic asset, and the like.

Method 100C can be present in the context of scenario 110, 130, 150, method 200, and/or system 300.

In step 105, a requestor can log into the system. In step 110, the requestor can navigates to the appropriate asset container. The relevant asset can be determined based on search parameters, asset properties, tagging data, and the like. In step 115, a requestor can select appropriate asset assembly. The assembly can be determined utilizing lexical analysis, metadata analysis, state information, ownership information, and the like. In step 125, the requestor can generate the specified asset. In step 130, the customized asset can include dynamic data which can be generated and presented to the requestor. In step 135, the requestor can utilize generated asset for reuse and further customization. In step 140, the method can end.

Drawings presented herein are for illustrative purposes only and should not be construed to limit the invention in any regard. Method 100C can be performed in real-time or near real-time. Method 100C can be performed in serial and/or in parallel. It should be appreciated that one or more steps of method 100C can be optionally omitted providing the functionality of method 100C is retained.

Figure 2:
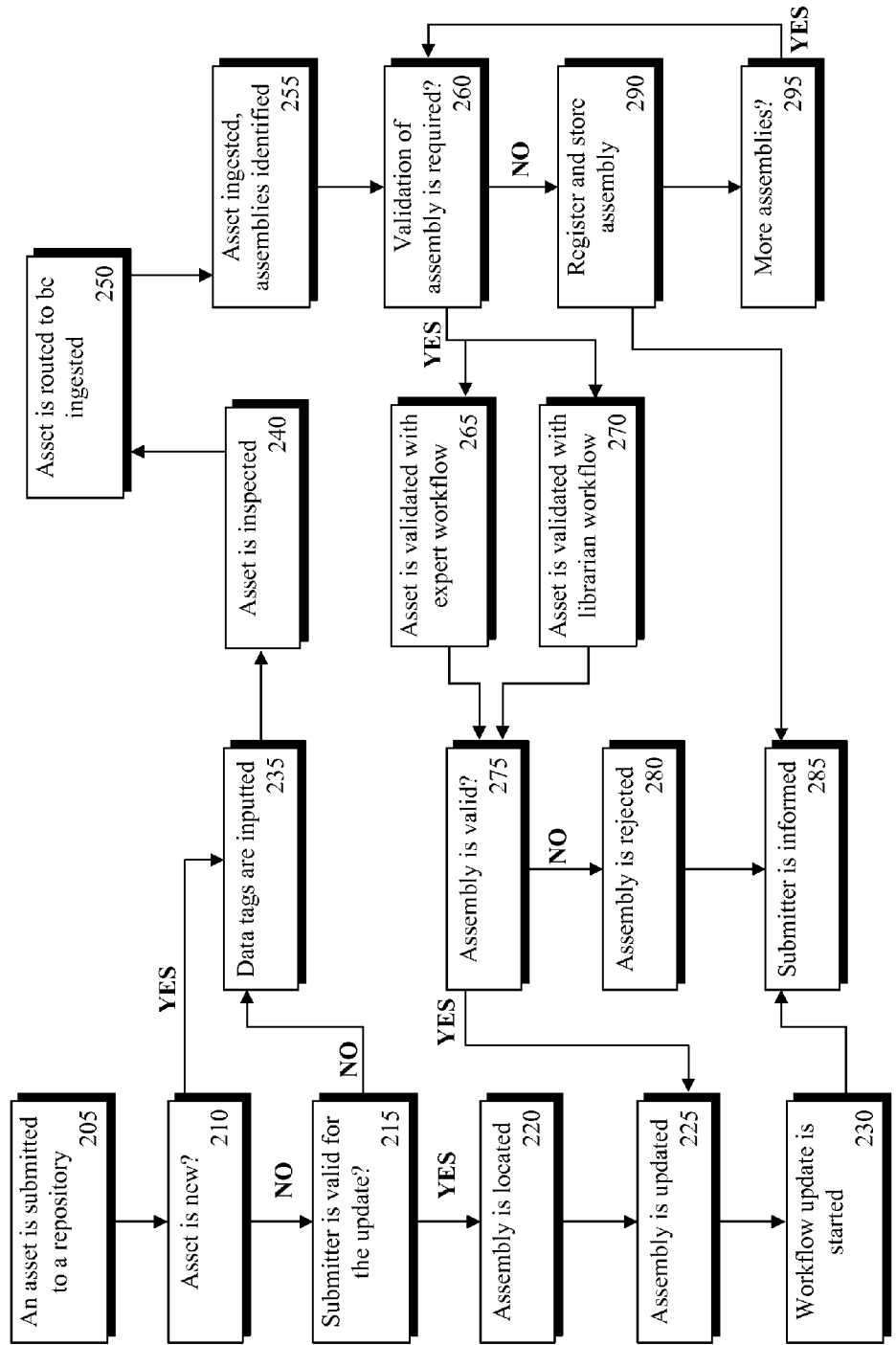
FIG. 2 is a flowchart illustrating a method for enabling dynamic polymorphic asset creation and reuse in accordance with an embodiment of the inventive arrangements disclosed herein.

FIG. 2 is a flowchart illustrating a method 200 enabling dynamic polymorphic asset creation and reuse in accordance with an embodiment of the inventive arrangements disclosed herein. Method 200 can be present in the context of scenario 110, 130, 150, method 100C, and/or system 300.

In step 205, an asset can be submitted via the appropriate channel to an asset repository. For example, the asset can be a file upload, a form submission, or a community update. It should be appreciated that relevant data (e.g., categories, dynamic content, and tags) about the asset can be provided by the submitter. In step 210, if the asset is a new asset, the method can continue to step 235, else continue to step 215. In one embodiment, a submitter can indicate if the submission is an update to an existing asset or a new asset. When the asset is an update to an existing asset, additional information can be prompted and received via an update screen. In one embodiment, the indication can be heuristically determined. For example, the disclosure can automatically determine if the submission is an update to an existing asset by analyzing metadata of the submission and existing assets. It should be appreciated, that a similar check can be performed after the asset is ingested (e.g., step 250). For example, a user may not know that the submitted asset (e.g., or a subset of the asset) already exists.

In step 215, if a submitter is authorized to perform an asset update, the method can continue to step 220, else proceed to step 235. If the submission is an update, the user's credentials can be checked to ensure the submitter is permitted to perform the submission. It should be appreciated that an asset can be updated by the owners, submitters, administrators, and the like. In step 220, an assembly associated with the asset is located. The asset can be located via an automated search, a user assisted search, and the like. In one embodiment, an asset can be located by utilizing metadata associated with the asset. In step 225, the assembly can be updated. In one embodiment, the assembly can be updated with a new data or a pointer to new data. In step 230, a workflow update can be started. The workflow can assemble appropriate communications update(s) to asset assembly lines and/or consumers of the asset. Preassembled assets which leverage the assembly can be staged for re-assembly. The workflow can determine related assets which can require updating and can communicate a notification to the owners of the related assets.

In step 235, data tags associated with the submission can be inputted. For example, the submitter can be required to fill out data identifying the asset content (e.g., which can be utilized in assembly creation). It should be appreciated that the data tags can be supplemental to submission in step 205. For example, data about the user can be looked up in a general directory (e.g., area of expertise) to determine relevant data tags. In step 240, the submission can be inspected. In one embodiment, the asset can be inspected to determine asset size, asset packaging, and the like. For example, the asset can be a slideshow presentation which can include a zip file of many documents, a location/formula for gaining data, and the like. In step 250, the asset can be conveyed to an appropriate entity for ingestion. In one embodiment, the asset can be conveyed to an appropriate entity by asset type, asset size, ingestion preferences, and the like. For example, submissions of a slideshow presentation can be conveyed to a slideshow engine. It should be appreciated that archives can be routed to and archive processors which can then be re-routed to another "ingestor". In step 255, the submission can be ingested and relevant assemblies can be identified. Ingestion can include the "breaking up" and/or organization of an asset into assemblies. Data entered by the submitter can aid in determining assembly contents. For example, a document can be "modularized" into various assemblies based on chapters, a table of contents, header levels, pages, and the like. Assemblies can include appropriate references to owners, factories, elements, and the location of the assemblies' data. It should be appreciated that the references enable the polymorphic capabilities of the assembly.

In step 260, if the assemblies need validation, the method can continue to step 265, else continue to step 290. The method can continue to either 265, 270 or both depending on method implementation, validation requirements, and the like. In step 265, the asset can be validated with an expert workflow. For example, the asset can be evaluated to determine if the assembly needs to be validated by experts in the field. It should be appreciated that validation can be bypassed based on submitter credentials, submitter expertise, submission content (e.g., opinion based submissions), and the like. In one instance, submissions with identified known experts, can be validated with those experts regarding updates and can be prompted for feedback on the submission. It should be appreciated that the disclosure involves both human and system actors a workflow can be leveraged to ensure a timely completion of the approval process.

In step 270, the asset can be validated with a librarian workflow. Submissions associated with non-experts can be conveyed to the warehouse librarians for review. In one instance, the librarians can locate appropriate reviewers for the asset content. In step 275, if the assembly is valid, the method can return to step 225, else continue to step 280. In step 280, the assembly can be rejected. When an assembly is rejected, the assembly can be processed to determine affected linked assets, if any. Affected assets can be appropriately processed. In step 285, the submitter can be informed. Notification can include e-mail notifications, text exchange messages, blogs-based notifications, community-based notifications, and the like.

In step 290, the assembly can be registered and stored. Assemblies can bypass a review process and can be stored/cataloged. In one embodiment, an "add" workflow can be started which can assemble the appropriate communications update(s) to asset assembly lines, consumers of the asset, and the like. It should be appreciated that preassembled assets which leverage the assembly can be staged for re-assembly. The extracted data and the raw data can be stored in the repository. In one instance, the add workflow can determine related assets which can require updating and can notify owners of the update on the related assets. In step 290, if there are more assemblies, the method can return to step 260.

Drawings presented herein are for illustrative purposes only and should not be construed to limit the invention in any regard. It should be appreciated that method 200 can include one or more optional steps. Method 200 can be performed in serial and/or in parallel. Method 200 can include one or more sub-methods (e.g., workflows) which can be iteratively performed, omitted, and/or run independently from method 200.

Figure 3:
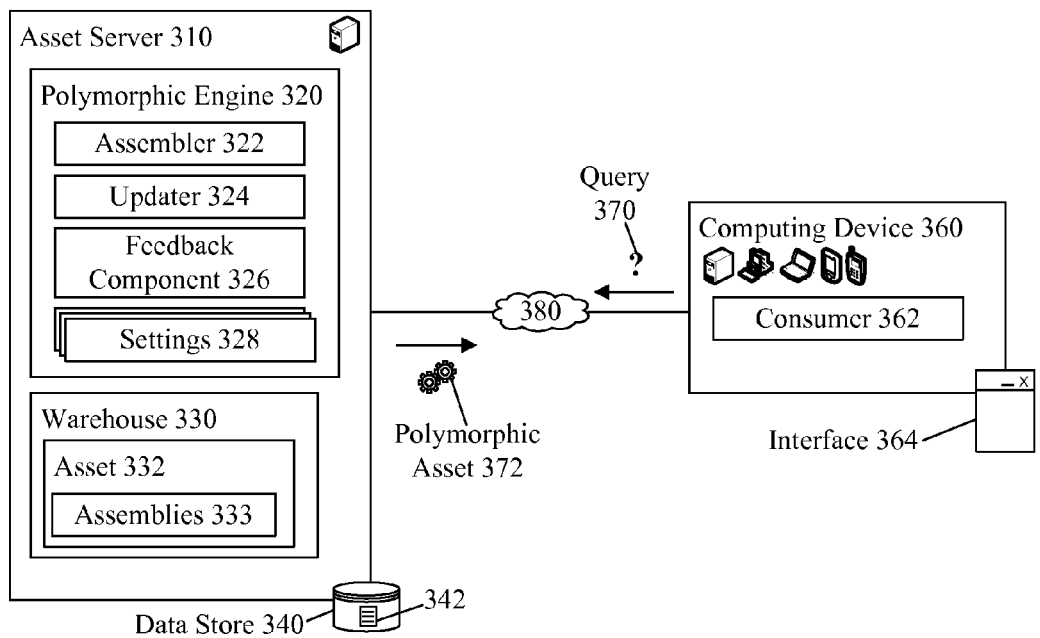
FIG. 3 is a schematic diagram illustrating a system for enabling dynamic polymorphic asset creation and reuse in accordance with an embodiment of the inventive arrangements disclosed herein.

FIG. 3 is a schematic diagram illustrating a system for enabling dynamic polymorphic asset creation and reuse in accordance with an embodiment of the inventive arrangements disclosed herein. System 300 components can be communicatively linked via one or more networks 380. System 300 can be performed in the context of scenario 110, 130, 150, method 100C, 200, and the like. In system 300, a polymorphic engine 320 can enable assemblies 333 to be dynamically assembled into appropriately formatted assets responsive to a query 370.

Asset server 310 can be a hardware/software element for executing polymorphic engine 320. Server 310 can include, but is not limited to, a repository, an inventory server, a content management system (CMS), and the like. Server 310 can include, but is not limited to, a polymorphic engine 320, a warehouse 330, a data store 340, and the like. Server 310 can be a component of a networked computing environment, a distributed computing environment, and the like. In one embodiment, server 310 can be a component of a Service Oriented Architecture (SOA).

Polymorphic engine 320 can be a hardware/software entity for enabling polymorphic asset 372 creation and/or management. Engine 320 can include, but is not limited to, an assembler 322, an updater 324, a feedback component 326, settings 328, and the like. Engine 320 can include one or more optional components 322-328. In one embodiment, engine 320 functionality can be present within a Web-based service. Engine 320 functionality can include, but is not limited to, tagging data parsing, asset searching, asset retrieval, logging, and the like.

Assembler 322 can be a hardware/software element for creating and/or managing assemblies 333. Assembler 322 can be utilized to determine asset 332 properties including, but not limited to, asset type (e.g., format), asset size, submission values (e.g., data tags), and the like. Assembler 322 can be receive query 370 and convey and appropriate polymorphic asset 372. In one instance, assembler 322 can utilize trigger map 342 to determine assembly access, usage, and the like. For example, when an assembly of assemblies 333 (e.g., portion of a polymorphic asset 372) is utilized, an asset 332 owner can be notified of the usage (e.g., trigger 344). In one instance, assembler 322 functionality can include, but is not limited to, asset 332 deconstruction, semantic analysis, assembly management, and the like.

Updater 324 can be a hardware/software entity for maintaining warehouse 330 currency. Updater 324 can update assemblies 333 based on feedback, related asset updates, and the like. In one instance, updater 324 can be utilized to determine asset submission updates. In the instance, updater 324 can automatically determine existing assets during an asset submission and can appropriately resolve asset submission conflicts. In another embodiment, when raw data associated with an assembly is modified, updater 324 can determine affected assemblies and appropriately update assembly. It should be appreciated that assemblies 333 update and/or asset 332 update can be performed in real-time or near real-time.

Feedback component 326 can be a hardware/software element for tracking and/or coordinating feedback associated with asset 332, polymorphic asset 372, and/or assemblies 333. In one embodiment, feedback component 326 can facilitate assemblies 333 level feedback. That is, feedback associated with a single assembly can be tracked and utilized to improve derived assets, subsequent assets (e.g., polymorphic asset 372) and the like. In one instance, component 326 can track metrics associated with an assembly. In the instance, metrics can be utilized to generate meaningful feedback including, but not limited to, internal heat maps, data consumption reports, and the like. It should be appreciated that feedback component 326 can include notification capabilities. Capabilities can include e-mail notification, Short Message Service (SMS) notification, text exchange notification, application messaging notification, and the like.

Settings 328 can be one or more options for configuring the behavior of system 300, server 310, engine 320, warehouse 330, and the like. Settings 328 can include, but is not limited to, engine 320 options, assembler 322 settings, updater 324 options, feedback component 326 settings, trigger map 342 options, and the like. In one instance, settings 328 can be heuristically determined based on one or more historic settings. In one embodiment, settings 328 can be presented within an interface associated with server 310, interface 364, and the like.

Warehouse 330 can be a hardware/software entity for persisting asset 332, assemblies 333, and the like. Warehouse 330 can include a networked data store, a federated data store, and the like. In one instance, warehouse 330 can include multiple warehouses. Warehouse 330 can be associated with one or more experts, users, submitters, librarians, workflows, and the like. In one instance, warehouse 330 can include settings (e.g., settings 328), workflow settings, and the like.

Asset 332 can be a content associated with warehouse 330. Asset 332 can conform to one or more traditional and/or proprietary formats. Asset 332 can include an assembly, assembly metadata, asset metadata, and the like. In one instance, asset 332 can be associated with a derived asset, a polymorphic asset, and the like. Derived asset can be an enhanced revision of asset 332 based on feedback, user input, and the like. Assemblies 333 can be associated with an index, a raw data, an assembly data, a linked data, and the like.

Data store 340 can be a hardware/software component able to persist trigger map 342, settings, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) complaint database.

Trigger map 342 can be a mapping enabling coordination of assembly management, assembly feedback, assembly notification, and the like. Map 342 can be manually and/or automatically maintained. Map 342 can be persisted within data store 340, warehouse 330 and the like. Map 342 can include, but is not limited to, a trigger identifier, an assembly identifier, an action, and the like. Action can include a programmatic action such as a report generation action, update action, notification action, and the like.

Computing device 360 can be a hardware/software permitting the processing and/or presentation of asset 372. Device 360 can include, but is not limited to, interface 364, device 360 settings, consumer 362, and the like. Computing device 360 can include, but is not limited to, a desktop computer, a laptop computer, a tablet computing device, a PDA, a mobile phone, and the like.

Consumer 362 can be an entity able to perform query 370. Consumer 362 can include a human agent, a computer entity, and the like. Consumer 362 can receive polymorphic asset 372 which can be presented within interface 364. Consumer 362 can include an application, an operating system, and the like. Consumer 362 can generate feedback of polymorphic asset 372 which can be conveyed to engine 320.

Interface 364 can be a user interactive component permitting interaction and/or presentation of asset 332, assemblies 333, and/or asset 372. Interface 364 can be present within the context of a Web browser application, an integrated development environment (IDE), and the like. In one embodiment, interface 364 can be a screen of a Rich Internet Application (RIA). Interface 364 capabilities can include a graphical user interface (GUI), voice user interface (VUI), mixed-mode interface, and the like. In one instance, interface 364 can be communicatively linked to computing device.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. It should be appreciated that polymorphic engine 320 can include optional components permitting the functionality of engine 320 is retained. It should be appreciated that one or more components within system 300 can be optional components permitting that the disclosure functionality be retained. It should be appreciated that one or more components of engine 320 can be combined and/or separated based on functionality, usage, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for asset reuse comprising:
   identifying an asset within a repository, wherein the asset is an electronic file, wherein the asset is comprise of an asset content and an asset metadata, wherein the asset content comprises of at least one of a static content and a dynamic content;
   semantically disassembling the asset into a plurality of assemblies, each assembly is an atomic element of the asset capable of being reusable for construction of one or more subsequent assets, wherein each atomic element is organized and indexed to permit singular or aggregate usage thereby allowing new assets to be created from parts of existing assets, wherein the asset is dissembled semantically based on the asset metadata, wherein the plurality of assemblies each comprise of at least an asset data and an assembly data, wherein the assembly data is at least one of an assembly identifier, an assembly rule, and an asset data source;
   determining a data container format associated with the asset content, wherein the data container is a computing data structure; and
   responsive to a request, dynamically presenting the asset content within a different data container format in accordance with the request.

2. The method of claim 1, wherein the plurality of assemblies are reusable singularly and aggregately in construction of the one or more subsequent assets.

3. The method of claim 1, further comprising:
   creating a visualization of an interaction with at least one of an assembly and an asset within the repository, wherein the visualization is at least one of a heat map, a graph, and an infographic.

4. The method of claim 1, further comprising:
   notifying a user of an interaction with at least one of an assembly and an asset, wherein the user is at least one of an asset owner, an asset submitter, and a user interested with the asset.

5. The method of claim 1, further comprising:
   creating a polymorphic asset upon receiving a knowledge query, wherein the polymorphic asset is created based on semantically identifying one or more assemblies relevant to the knowledge query, wherein the polymorphic asset comprises the one or more assemblies, wherein the polymorphic asset is comprised of a data container and a plurality of assembly data.

6. The method of claim 1, further comprising:
   responsive to an assembly usage, notifying a user of the assembly usage.

7. The method of claim 1, further comprising updating at least one assembly amongst the plurality of assemblies in response to a change in corresponding asset data, wherein the one or more subsequent assets created using the at least assembly comprises the changed asset data.

8. The method of claim 1, further comprising:
   deriving a different asset from the asset within the repository, wherein the different asset is comprised of at least a portion of data from the asset.

9. The method of claim 1, further comprising:
   executing an assembly rule responsive to a knowledge query associated with the asset, wherein the executing creates an asset according to the rule, wherein the asset comprises of at least one assembly.

10. The method of claim 1, wherein the assembly conforms to a name value pairing format, wherein the assembly data comprises a paring indicative of the data container format, wherein the pairing is changed to dynamically present the asset content within the different data container format.

11. The method of claim 1, further comprising:
indexing an assembly associated with the asset, wherein the index conforms to a document type definition, and wherein the index comprises of at least one of a category and a status.

12. A system for asset reuse comprising:
one or more processors;
one or more non-transitory storage mediums storing programmatic instructions;
a polymorphic engine, comprising at least a subset of the programmatic instructions, wherein execution of the subset of the programmatic instructions by the one or more processors causes the system to:
dynamically create a polymorphic asset, wherein the polymorphic asset is an asset comprised of at least one assembly, wherein the assembly is an atomic element of a source asset, wherein the atomic element is organized and indexed to permit singular or aggregate usage thereby allowing new assets to be created from parts of existing assets, wherein the source asset is a digital content; and
a data store, which is a non-transitory storage medium that persists at least one of an assembly index, an assembly data, an asset, and an engine settings.

13. The system of claim 12, further comprising:
an assembler, comprising at least a subset of the programmatic instructions, wherein execution of the assembler's subset of the programmatic instructions by the one or more processors causes the system to decompose the source asset into a plurality of assemblies, wherein the source asset is decomposed into the plurality of assemblies semantically based on an asset metadata associated with the source asset, wherein the assembly comprises of at least one of an asset data and an assembly data;
an updater, comprising at least a subset of the programmatic instructions, wherein execution of the updater's subset of the programmatic instructions by the one or more processors causes the system to detect a change in at least one of the source asset and an assembly amongst the plurality of assemblies; and
a feedback component, comprising at least a subset of the programmatic instructions, wherein execution of the subset of the programmatic instructions by the one or more processors causes the system to receive a feedback associated with the assembly, wherein the feedback is at least one of a metric and a user input.

14. The system of claim 12, wherein the assembly conforms to an Extensible Markup Language (XML) document.

15. The system of claim 13, wherein the assembler is configured to construct a polymorphic asset, wherein the polymorphic asset is comprised of a data container and a plurality of assembly data.

16. The system of claim 12, wherein execution of the programmatic instructions by the one or more processors causes the system to determine a portion of an asset within an asset repository utilizing tagging data associated with the portion, wherein the portion is at least one of a string, an object, a file, and an archive.

17. The system of claim 12, wherein execution of the programmatic instructions by the one or more processors causes the system to:
determine a change data associated with an assembly within an asset repository; and
update the assembly based on the change data and responsive to the updating, modifying a different assembly linked to the assembly.

18. A computer program product comprising a non-transitory computer readable storage medium having computer usable program code embodied therewith, the computer usable program code comprising:
computer usable program code stored in a non-transitory storage medium, if said computer usable program code is run by a processor it is operable to identify an asset within a repository, wherein the asset is an electronic file, wherein the asset is comprise of an asset content and an asset metadata, wherein the asset content comprises of at least one of a static content and a dynamic content;
computer usable program code stored in a non-transitory storage medium, if said computer usable program code is run by a processor it is operable to disassemble the asset into a plurality of assemblies, wherein the asset is dissembled semantically based on the asset metadata, wherein each asset is composed of one or more atomic elements, each being organized and indexed to permit singular or aggregate usage thereby allowing new assets to be created from parts of existing assets, wherein the plurality of assemblies each comprise of at least an asset data and an assembly data, wherein the assembly data is at least one of an assembly identifier, an assembly rule, and an asset data source;
computer usable program code stored in a non-transitory storage medium, if said computer usable program code is run by a processor it is operable to determine a data container format associated with the asset content, wherein the data container is a computing data structure;
computer usable program code stored in a non-transitory storage medium, if said computer usable program code is run by a processor it is operable to dynamically present the asset content within a different data container format in accordance with the request responsive to a request.

19. The computer program product of claim 18, further comprising:
the program code conveying a feedback associated with an assembly to a user associated with the assembly.

20. The computer program product of claim 18, wherein the assembly conforms to an Extensible Markup Language (XML) document.

* * * * *